(12) United States Patent
Varghese

(10) Patent No.: US 11,418,441 B2
(45) Date of Patent: Aug. 16, 2022

(54) HIGH-LEVEL DEFINITION LANGUAGE FOR CONFIGURING INTERNAL FORWARDING PATHS OF NETWORK DEVICES

(71) Applicant: Juniper Networks, Inc., Sunnyvale, CA (US)

(72) Inventor: Alex Varghese, Gilroy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 25 days.

(21) Appl. No.: 16/933,705

(22) Filed: Jul. 20, 2020

(65) Prior Publication Data
US 2022/0021609 A1 Jan. 20, 2022

(51) Int. Cl.
*H04L 45/00* (2022.01)
*G06F 8/30* (2018.01)
*G06F 9/30* (2018.01)
*H04L 45/02* (2022.01)

(52) U.S. Cl.
CPC .............. *H04L 45/56* (2013.01); *G06F 8/315* (2013.01); *G06F 9/30007* (2013.01); *H04L 45/02* (2013.01)

(58) Field of Classification Search
CPC ......... H04L 45/56; H04L 45/02; H04L 12/56; G06F 8/315; G06F 9/30007; G06F 11/3644
See application file for complete search history.

(56) References Cited

U.S. PATENT DOCUMENTS

| | | | |
|---|---|---|---|
| 8,806,058 B1 | 8/2014 | Mackie et al. | |
| 10,318,872 B1* | 6/2019 | Feynman | G06N 5/04 |
| 10,395,321 B2* | 8/2019 | Shalita | G06Q 30/0255 |
| 10,469,357 B2 | 11/2019 | Kananda et al. | |
| 10,476,492 B2* | 11/2019 | More | H03K 19/1733 |
| 10,536,375 B2 | 1/2020 | Nimmagadda et al. | |
| 10,685,021 B2* | 6/2020 | Fender | G06F 16/24549 |
| 10,719,506 B2* | 7/2020 | Acharya | G06F 16/243 |
| 10,719,637 B2* | 7/2020 | Avron | G06F 30/20 |
| 2005/0152286 A1 | 7/2005 | Betts et al. | |
| 2018/0365287 A1 | 12/2018 | Fontenot et al. | |

OTHER PUBLICATIONS

Extended Search Report from counterpart European Application No. 20201396.7 dated Mar. 2, 2021, 9 pp.

* cited by examiner

*Primary Examiner* — Chandrahas B Patel
(74) *Attorney, Agent, or Firm* — Shumaker & Sieffert, P.A.

(57) ABSTRACT

In general, the disclosure describes techniques for configuring a forwarding path of a network device. For example, a network device system includes a compiler. The compiler is configured to receive text comprising syntax elements in an arrangement that indicates a topology for a plurality of nodes. Additionally, the compiler is configured to generate, based on the text, code for instantiating the plurality of and compile the code to generate a software image. The network device system includes a network device comprising a forwarding manager configured to execute the software image to configure a forwarding path to include the corresponding forwarding path elements for each of the plurality of nodes. Additionally, the network device system includes at least one packet processor operably coupled to a memory, wherein the at least one packet processor is configured to process packets received by the forwarding unit by executing the forwarding path elements.

28 Claims, 6 Drawing Sheets

HIGH-LEVEL DEFINITION LANGUAGE FOR CONFIGURING INTERNAL FORWARDING PATHS OF NETWORK DEVICES

TECHNICAL FIELD

The disclosure relates to packet-based computer networks and, more particularly, to processing packets within network devices.

BACKGROUND

A computer network is a collection of interconnected computing devices that can exchange data and share resources. Network devices within computer networks often include a control unit that provides control plane functionality for the network device and one or more forwarding units for routing or switching data units, e.g., packets. In some cases, for example, a network device may include a plurality of packet processors and a switch fabric that collectively provide a forwarding plane for forwarding network traffic. The forwarding plane of the network device may include a forwarding path which comprises one or more forwarding path elements. The data and instructions that constitute the forwarding path elements may be connected and arranged into a forwarding topology that defines an internal forwarding path for each incoming packet received by the network device.

SUMMARY

In general, the disclosure describes techniques for employing a high-level language having syntax elements that can be used to configure one or more forwarding path elements of a network device and define the topology of the forwarding path elements using an arrangement of the syntax elements that makes the topology of the forwarding path elements visually apparent from code written in the high-level language. For example, a network device may include a control plane for controlling one or more functions of the network device and a forwarding plane for receiving and forwarding network traffic. In some examples, the forwarding plane includes a forwarding path in which the one or more forwarding path elements (e.g., forwarding next hops) are arranged in a topology for processing incoming packets. A software image generated by a compiler, as described in further detail below, may be executed by the network device to configure the forwarding path. The software image may be, for instance, a library linked with other software for the network device, a separate binary, or other executable code.

In some examples, a computing system that executes the compiler receives a forwarding path definition in the form of text having syntax elements that include a set of operands and a set of operators. At least some of the set of operands may be associated with forwarding path elements to be instantiated in the forwarding plane of the network device. The set of operators may be arranged to define a topology, e.g., to form a hierarchy of the set of operands, where the hierarchy includes one or more levels. The compiler may process the text to generate code and then compile the generated code to generate a software image for configuring and managing nodes that represent the forwarding path elements in a topology that is indicated by an arrangement of syntax elements within the text. By executing the software image generated by the compiler, the forwarding plane is able to instantiate and arrange the forwarding path elements in a topology which corresponds to the hierarchy of operands indicated by the text. The forwarding manager may also receive forwarding path element configuration data from the control plane for configuring the one or more forwarding path elements by executing the software image to instantiate the forwarding path elements and managing the forwarding path elements using the plurality of nodes.

The techniques described herein provide one or more technical improvements having at least one practical application. For example, it may be beneficial for the syntax to form a hierarchy of operands which corresponds to the topology of nodes used to configure forwarding path elements. In some examples, the compiler may receive one or more user edits to the syntax. The syntax may represent a layout of the operands and operators such that the hierarchy of operands is visible in the syntax, meaning that it is easier to edit the syntax in order to change a configuration of the forwarding path elements as compared with systems which do not configure forwarding path elements based on syntax which visually indicates a hierarchy of operands. Additionally, the high-level language of the syntax may decrease a likelihood of programming errors in the syntax as compared with systems which configure a forwarding path based on user edits to computer code that is not in the high-level language.

In some examples, a network device system includes a compiler which is configured to receive text comprising syntax elements in an arrangement that indicates a topology for a plurality of nodes, wherein each node of the plurality of nodes corresponds to a forwarding path element of a plurality of forwarding path elements. Additionally, the compiler is configured to generate, based on the text, code for instantiating the plurality of nodes in the indicated topology for the plurality of nodes and compile the code to generate a software image for a network device. The network device system further includes the network device. The network device includes a forwarding manager configured to execute the software image to configure a forwarding path to include the corresponding forwarding path elements for each of the plurality of nodes. Additionally, the network device includes at least one packet processor operably coupled to a memory, wherein the at least one packet processor is configured to process packets received by the forwarding unit by executing the forwarding path elements.

In some examples, a method includes receiving, by a compiler, text comprising syntax elements in an arrangement that indicates a topology for a plurality of nodes, wherein each node of the plurality of nodes corresponds to a forwarding path element of a plurality of forwarding path elements and generating, by the compiler based on the text, code for instantiating the plurality of nodes in the indicated topology for the plurality of nodes. Additionally, the method includes compile, by the compiler, the code to generate a software image for a network device, executing, by a forwarding manager of the network device, the software image to configure a forwarding path to include the corresponding forwarding path elements for each of the plurality of nodes, and processing, by at least one packet processor operably coupled to a memory, packets received by the forwarding unit by executing the forwarding path elements.

In some examples, a non-transitory computer-readable medium includes instructions for causing one or more programmable processors and at least one packet processor of a forwarding unit of a network device to receive, by a compiler, text comprising syntax elements in an arrangement that indicates a topology for a plurality of nodes, wherein each node of the plurality of nodes corresponds to a forwarding path element of a plurality of forwarding path elements and generate, by the compiler based on the text, code for instantiating the plurality of nodes in the indicated topology for the plurality of nodes. Additionally, the instructions cause the one or more programmable processors and the at least one packet processor of the forwarding unit of the network device to compiler, by the compiler, the code to generate a software image for a network device, execute, by the network device, the software image to configure a forwarding path to include the corresponding forwarding path elements for each of the plurality of nodes, and process, by the at least one packet processor operably, packets received by the forwarding unit by executing the forwarding path elements.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters refer to like elements throughout the text and figures.

DETAILED DESCRIPTION

Figure 1:
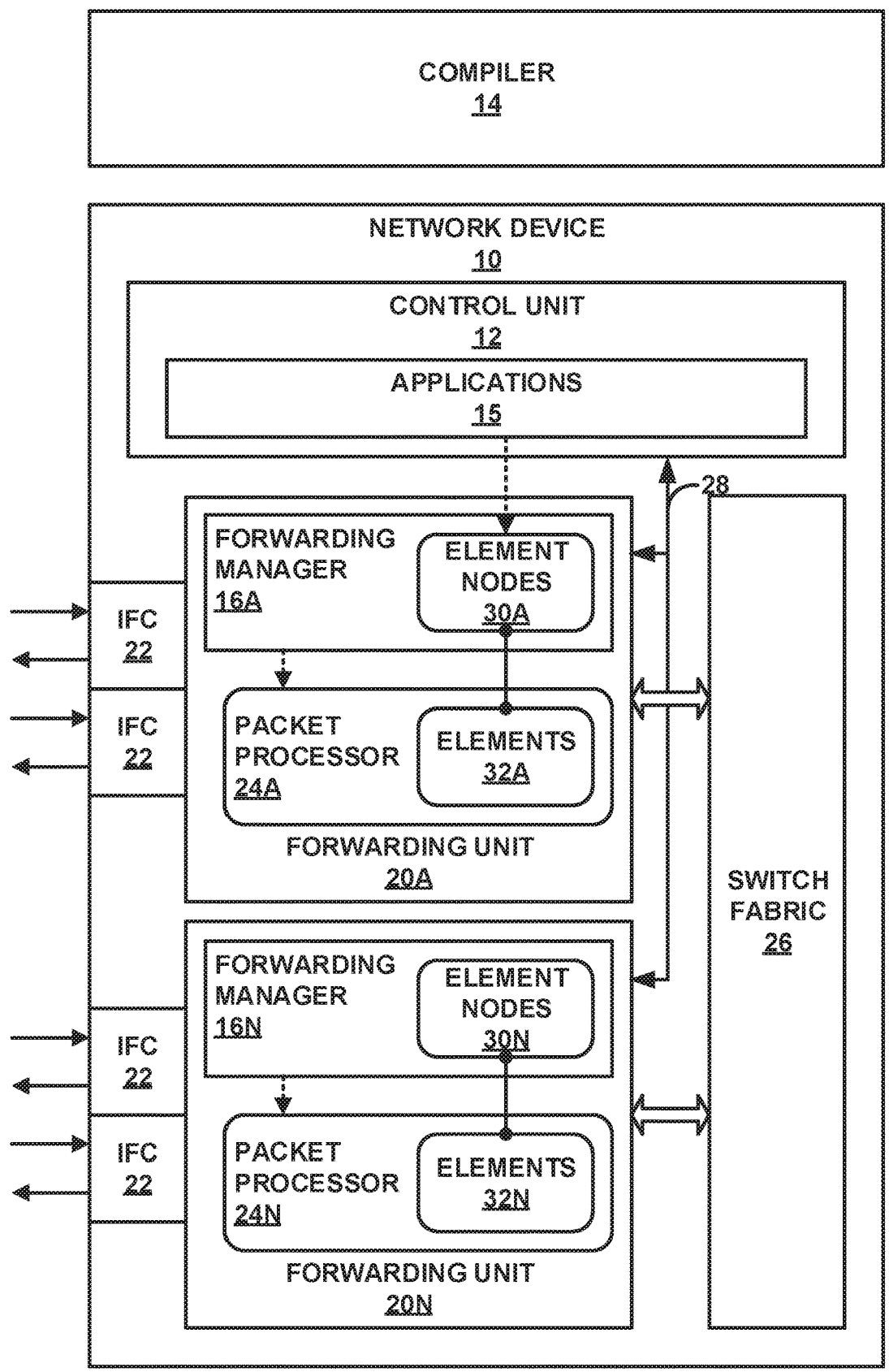
FIG. 1 is a block diagram illustrating an example network device in which one or more forwarding units are configured, in accordance with one or more techniques of this disclosure.

FIG. 1 is a block diagram illustrating an example network device in which one or more forwarding units are configured, in accordance with one or more techniques of this disclosure. Network device 10 may include a router such as a provider edge or customer edge router, a core router, or another type of network device, such as a switch. In this example, network device 10 includes a control unit 12 that provides control plane functionality for the device. Network device 10 also includes a plurality of forwarding units 20A-20N ("forwarding units 20") and a switch fabric 26 that together provide a data plane for processing network traffic. Forwarding units 20 receive and send data packets via interfaces of interface cards 22A-22N ("IFCs 22") each associated with a respective one of forwarding units 20. Each of forwarding units 20 and its associated ones of IFCs 22 may represent a separate line card insertable within a chassis (not shown) of network device 10. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may include more or fewer IFCs. Switch fabric 26 provides a high-speed interconnect among forwarding units 20 for forwarding incoming data packets to an egress forwarding unit of forwarding units 20 for output over a network that includes network device 10.

Control unit 12 is connected to each of forwarding units 20 by internal communication links 28. Internal communication links 28 may include a 100 Mbps Ethernet connection, for instance. Control unit 12 configures, by sending instructions and other configuration data via internal communication link 28, forwarding units 20 to define packet processing operations applied to packets received by forwarding units 20. Control unit 12 executes one or more applications including, for example, applications 15. Each of the applications executed by control unit 12 may represent a separate process managed by a control unit operating system.

Control unit 12 may include one or more processors (not illustrated in FIG. 1) that execute software instructions, such as those used to define a software or computer program, stored to a computer-readable storage medium (again, not illustrated in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In some examples, compiler 14 may process information. For example, compiler 14 may receive text including syntax indicating a set of operators and a set of operands. As described herein, the term "operator" may refer to a function which is indicated by syntax and the term "operand" may refer to an object indicated by the syntax which serves as an input to at least one operator indicated by the syntax. Responsive to receiving the syntax, compiler 14 may process the syntax in order to generate computer code. In some examples, to process the syntax, compiler 14 may execute one or more functions of the set of operators indicated by the syntax, the compiler 14 using the operands of the syntax as inputs to the respective functions. Compiler 14 may represent an application executed by a computing system (not shown in FIG. 1) which is separate from network device 10.

Additionally, compiler 14 may compile the code in order to generate a software image for execution by network device 10. The computing system may include one or more processors coupled to a memory, communication units, storage devices, input/output devices, an operating system, and other components of an executable environment to execute compiler 14.

In some examples, a forwarding unit of forwarding units 20 (e.g., forwarding unit 20A) may execute the software image in order to control a manner in which forwarding unit 20A forward packets. The software image may include software which causes a forwarding unit (e.g., forwarding unit 20A) to configure a forwarding path which processes packets received via IFCs 22. For example, each forwarding unit of forwarding units 20 includes at least one packet processor 24 that processes packets by performing a series of operations on each packet over respective internal packet forwarding paths as the packets traverse the internal architecture of network device 10. Packet processor 24A of forwarding unit 20A, for instance, includes one or more configurable hardware chips (e.g., a chipset) that, when configured by applications executing on control unit 12, define the operations to be performed by packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent ASIC-based, FPGA-based, or other programmable hardware logic. A single forwarding unit 20 may include one or more packet processors 24.

Operations may be performed, for example, on each packet by any of a corresponding ingress interface, an ingress forwarding unit 20, an egress forwarding unit 20, an egress interface or other components of network device 10 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, each of packet processors 24 arranges forwarding path elements as next hop data that can be chained together as a series of "hops" in a forwarding topology along an internal packet forwarding path for the network device. The result of packet processing determines the manner in which a packet is forwarded or otherwise processed by packet processors 24 of forwarding units 20 from its input interface on one of IFCs 22 to, at least in some cases, its output interface on one of IFCs 22.

Additional description of forwarding next hops and other forwarding path elements is found in U.S. Pat. No. 10,469,357, entitled NODE REPRESENTATIONS OF PACKET FORWARDING PATH ELEMENTS, issued Nov. 5, 2019, and U.S. Pat. No. 10,536,375, entitled INDIVIDUAL NETWORK DEVICE FORWARDING PLANE RESET, issued Jan. 14, 2020. The entire content of each of these patents is incorporated herein by reference.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Applications configured for execution by control unit 12 may generate data which allow forwarding units 20 to configure forwarding paths for processing packets. For example, forwarding unit 20A may receive data from applications 15 of control unit 12. The software image may include software that, when executed by one or more processors of forwarding unit 20A, allows forwarding unit 20A to configure forwarding path elements 32A based on data received from applications 15.

Forwarding units 20 include respective forwarding managers 16 which execute the software image generated by compiler 14 and translate the data received from applications 15 into forwarding path elements 32 (which may include forwarding "next hops" and hereinafter referred to as forwarding path elements) that include instructions executable by respective packet processors 24 and stores the forwarding path elements 32 to memory of packet processors 24 (not illustrated in FIG. 1). Each of forwarding managers 16 may represent executable instructions, such as instructions for a process. Packet processors 24 execute the forwarding path elements 32 to process received packets. Forwarding path elements 32 may be chained together to define a set of packet processing operations for a given packet and form a "forwarding path" for that packet. The set of forwarding path elements 32 and forwarding state for execution and use by packet processors 24 may therefore alternatively be referred to as the forwarding path or internal forwarding path for a given packet processor 24, forwarding unit 20, or the network device 10 as a whole.

In accordance with techniques described in this disclosure, forwarding managers 16 represent forwarding path elements 32 using corresponding element nodes 30 (hereinafter, nodes 30"). Hereinafter, the techniques are described with respect to forwarding unit 20A.

Each node of nodes 30A is a data structure managed by forwarding manager 16A and represents a single forwarding path element 32A for execution by packet processor 24A. A forwarding path element may be of a type to perform a simple action (such as a counter or discard), a conditional, or a complex construct such as a table, tree, or lookup. Nevertheless, forwarding manager 16A uses node instances of the common node data structure to represent and refer to each of the forwarding path elements 32. Each node instance may have a type that corresponds to the type of forwarding path element (e.g., action, tree, etc.). In some examples, the data structure corresponding to each node of the nodes 30A may be collectively referred to herein as "forwarding path element configuration data." In some examples, the forwarding path element configuration data may define a topology of nodes 30A (e.g., one or more relationships between one or more nodes of nodes 30A). The topology of nodes 30A may correspond to a hierarchy of operands indicated by syntax received by compiler 14. As such, compiler 14 may convert the hierarchy of the operands into the forwarding path element configuration data which includes nodes 30A and the one or more relationships between nodes of nodes 30A.

Each of nodes 30A includes a token that is a unique identifier for a corresponding forwarding path element 32A that uniquely identifies the node within a context for the corresponding forwarding path element 32. The unique identifier may be, e.g., a 64-bit or other n-bit integer value for the token.

Forwarding manager 16A creates dependencies between nodes by referencing the token for the next node in a forwarding topology. For example, forwarding manager 16A may specify a second, next forwarding path element for a first forwarding path element by adding the token of the second, next forwarding path element to a list of next forwarding path elements for the first forwarding path element. This inherent token referencing allows connections between nodes to be easily abstract and thus more readily manipulated, provides a consistent interface across process and memory boundaries within forwarding manager 16A, and may facilitate multi-threading. Token referencing among nodes 30A may in these ways present one or more advantages over pointer-based schemes in which each forwarding path element is represented and referred to by its location in packet processor 24A memory.

Each node of nodes 30A can have dependencies, which are other nodes 30A that are referred to by the unique tokens of the other nodes 30A. Such dependencies may include not only the next forwarding path elements for the node but also include dependencies that notify forwarding manager 16A that a change in one node or entry may require another node to be updated.

In some cases, compiler 14 may generate code based on the syntax received by compiler 14. Subsequently, compiler 14 may compile the generated code in order to generate a software image for a router, the software image including machine-readable instructions for execution by forwarding managers 16 to configure forwarding path elements 32. The set of operands included in the syntax may include at least one operand corresponding to each node of nodes 30A. Moreover, the topology of nodes 30A may be indicated by the operators of the syntax received by compiler 14. Forwarding manager 16A may execute the software image generated by compiler 14 in order to, based on the data received from applications 15, generate the forwarding path element configuration data corresponding to nodes 30A. In generating the forwarding path element configuration data corresponding to nodes 30A, forwarding manager 16A may configure forwarding path elements 32A. Compiler 14 may be configured to generate the code based on a hierarchy of operands indicated in the syntax received by compiler 14. For example, one or more operands may each correspond to a node, and one or more operators may define a hierarchy of operands, wherein the hierarchy of operands corresponds to the topology of nodes 30A. It may be beneficial for the syntax to define the hierarchy of operands so that a user can easily modify nodes 30A and thus modify forwarding path elements 32A by modifying the syntax received by compiler 14.

Figure 2:
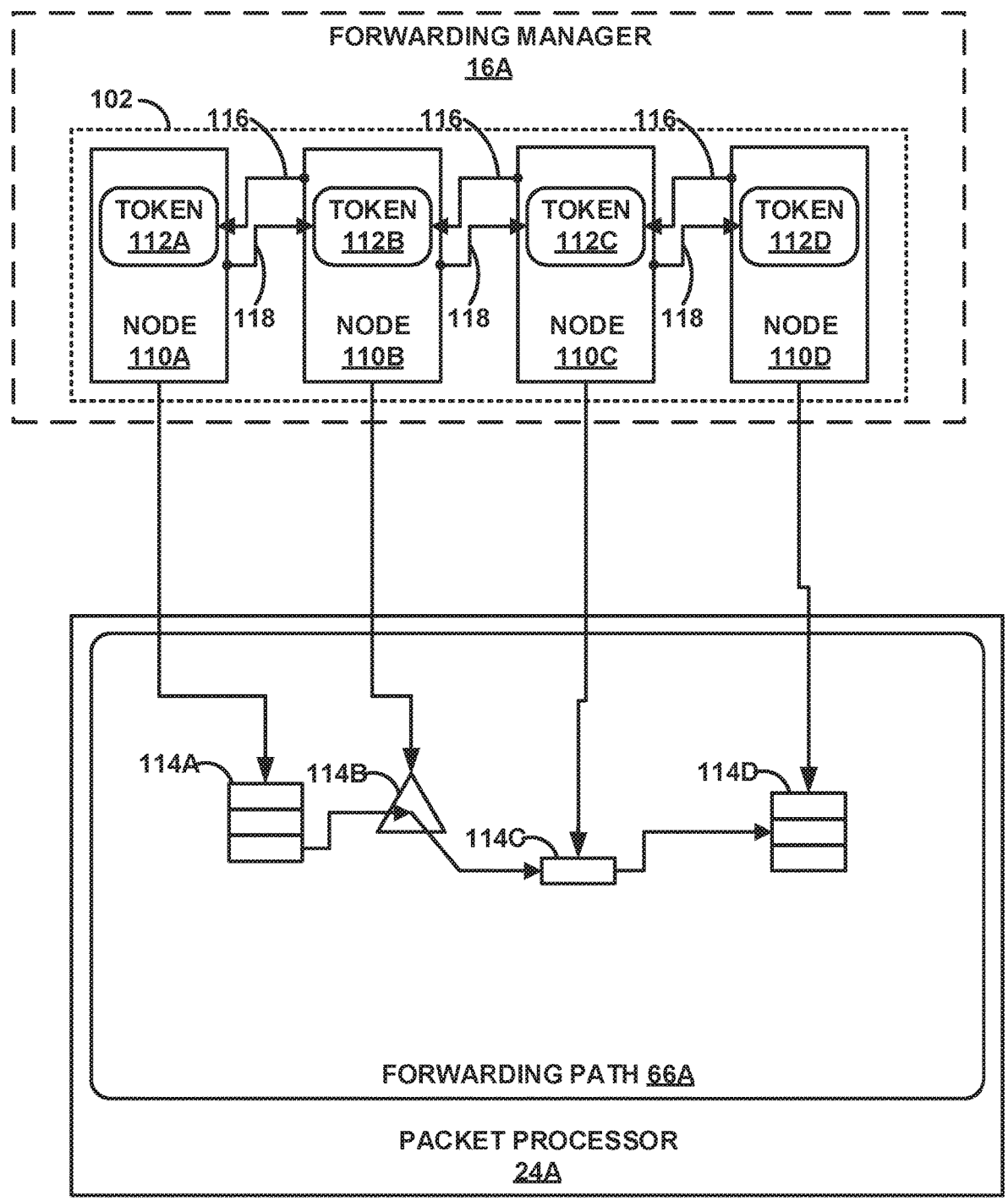
FIG. 2 is a block diagram illustrating, in further detail, a packet processor and a forwarding manager for a packet processor, in accordance with one or more techniques of this disclosure.

FIG. 2 is a block diagram illustrating, in further detail, a packet processor 24A and a forwarding manager 16A for a packet processor, in accordance with one or more techniques of this disclosure. As seen in FIG. 2, forwarding manager 16A hosts forwarding path configuration data 102 which includes nodes 110A-110D (collectively, "nodes 110"), tokens 112A-112D (collectively, "tokens 112"), reverse token references 116, and forward token references 118. In some examples, nodes 110 may represent instances of nodes 30A of FIG. 1. As seen in FIG. 2, Packet processor 24A includes a forwarding path 66A having forwarding path elements 114A-114D (collectively, "forwarding path elements 114"). For illustration purposes, a limited number of forwarding path elements 114 are shown in a simplified topology. Other instances of forwarding path 66A may include many thousands of forwarding path elements connected in complex topologies. Additional details of forwarding path 66A are included below with respect to FIG. 3.

Forwarding path elements 114A, 114B, and 114D represent forwarding path elements that are lookup containers, such as tables or trees. Lookup containers are configured with one or more entries that are the individual match elements for the containers. An entry may be identified by its parent container forwarding path element 114, a unique key for matching the lookup item, and a node token 112 that identifies the subsequent node of nodes 110 to execute on a successful match of the unique key to the lookup item (e.g., a packet field or interface). For example, an entry in a lookup tree 114C may have a unique key that matches to a packet field and refer to a node 110 that represents a counter-type forwarding path element 114C. Forwarding manager 16A configures forwarding path 66A such that a packet processing using lookup tree 114C having a packet field value that matches the unique key is subsequently processed using forwarding path element 114C.

Each of nodes 110 represents a corresponding one of forwarding path elements 114 and is usable by forwarding manager 16A for manipulating, referencing, and configuring forwarding path 66A with the corresponding forwarding path element 114. Each of nodes 110 include a corresponding token 112. For example, node 110A includes token 112A, node 110B includes token 112B, and so forth. Forwarding manager 16A uses tokens 112 to create connection among nodes 110 by modifying any node 110 to specify a token 112 of another node 110. Each node of node 110 may include a list of token references for one or more other nodes 110 that represent forward or reverse dependencies of the node. In some example implementations, forwarding manager 16A includes a separate data structure to store token references for nodes 110.

Nodes 110 may include forward token references 118 and reverse token references 116 to tokens 112 of other nodes 110. In the illustrated example, for instance, node 110B includes a forward token reference 118 to token 112C of node 110C. Node 110C includes a reverse token reference 116 to token 112B of node 110B. Forward token references 118 may be a token value specified for an entry of a forwarding path element. For instance, forward token reference 118 from node 110B to node 110C may be a token value for an entry of the forwarding path element 114B. Based on this forward token reference 118, forwarding manager 16A configures forwarding path 66A to connect forwarding path element 114B to forwarding path element 114C in a forwarding topology of forwarding path 66A.

In some examples, compiler 14 generates a software image responsive to compiler 14 receiving text that includes syntax which indicates a hierarchy of operands. The hierarchy of operands is indicated by one or more operators in the syntax. Each operand of the one or more operands may correspond to a node of nodes 110 and a token of tokens 112. The hierarchy of operands may represent to the topology of nodes 110. In this way, compiler 14 may generate the software image such that network device 10 configures reverse token references 116 and forward token references 118 based on the hierarchy of operands indicated in the syntax by the one or more operators. Additionally, forwarding manager 16A may receive data from applications 16A which includes information corresponding to respective nodes of nodes 110. Forwarding manager 16A may execute the software image of the router in order to generate the forwarding path configuration data 102 based on data received from applications 15. In some examples, forwarding manager 16A may configure modifications to forwarding path 66A by executing a modified software image generated by compiler 14. For example, compiler 14 may receive modified syntax and generate code based on the modified syntax. Compiler 14 compiles the generated code in order to generate a modified software image for the forwarding path 66A. Forwarding manager 16A may execute the modified software image in order to configure forwarding path elements 114 according to the modified syntax.

Figure 3:
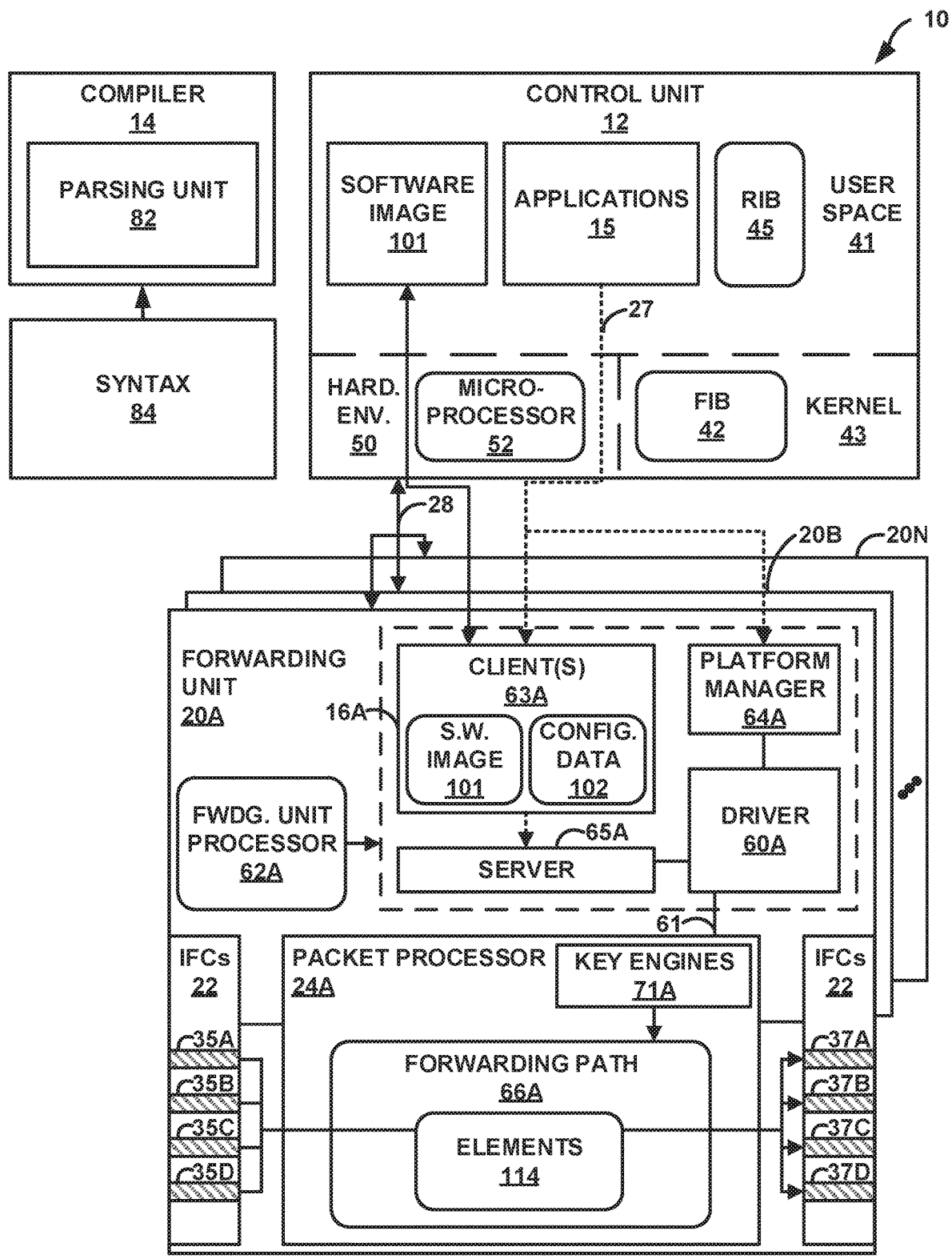
FIG. 3 is a block diagram illustrating, in further detail, a network device in which a forwarding unit is configured, in accordance with one or more techniques of this disclosure.

FIG. 3 is a block diagram illustrating, in further detail, network device 10 in which a forwarding unit 20A is configured, in accordance with one or more techniques of this disclosure. In this example, control unit 12 includes a combination of hardware and software that provides a control plane operating environment for execution of various user-level host applications executing in user space 41. By way of example, applications executing in user space 41 may include applications 15 and routing information base 45 ("RIB 45"). Compiler 14 may represent an application executed by a computing system separate from network device 10. As seen in FIG. 3, compiler 14 includes a parsing unit 82. Control unit 12 may provide forwarding plane, service plane, and control plane functionality for network device 10. Although illustrated in FIG. 3 as being a single control unit, control unit 12 may, in some cases, be distributed among multiple control units.

Applications 15 execute on and interact with kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 50 of control unit 12 includes microprocessor 52 that executes program instructions loaded into a memory (not illustrated in FIG. 3) from a storage device (also not illustrated in FIG. 3) in order to execute the software stack, including both kernel 43 and user space 41, of control unit 12. Kernel 43 includes forwarding information base 42 ("FIB 42"). Applications 15 may install one or more routes from RIB 45 to FIB 42, in some examples.

Microprocessor 52 may include, for example, digital signal processors (DSPs), ASICs, FPGAs, or equivalent discrete or integrated logic circuitry, or a combination of any of the foregoing devices or circuitry. Accordingly, microprocessor 52 may include any suitable structure, whether in hardware, software, firmware, or any combination thereof, to perform the functions ascribed herein to microprocessor 52. The terms "processor" or "controller," as used herein, may refer to any one or more of the foregoing structures or any other structure operable to perform techniques described herein.

A memory (not illustrated in FIG. 3) may be configured to store information within network device 10 during operation. The memory may include a computer-readable storage medium or computer-readable storage device. In some examples, the memory includes one or both of a short-term memory or a long-term memory. The memory may include, for example, RAM, DRAM, SRAM, magnetic discs, optical discs, flash memories, or forms of EPROM or electrically erasable and programmable memories (EEPROM). In some examples, the memory is used to store program instructions for execution by microprocessor 52.

In some examples, a routing protocol process executes one or more interior and/or exterior routing protocols to exchange routing information with other network devices and store received routing information in RIB 45. RIB 45 may include information defining a topology of a network, including one or more routing tables and/or link-state databases. The routing protocol process resolves the topology defined by routing information in RIB 45 to select or determine one or more active routes through the network and then installs these routes to FIB 42 of kernel 43. Typically, the routing protocol process generates FIB 42 in the form of a radix or other lookup tree to map packet information (e.g., header information having destination information and/or a label stack) to next hop devices and ultimately to interface ports of interface cards associated with respective forwarding units 20A-20N (collectively, "forwarding units 20"). In some examples, each of forwarding units 20 may be programmed with a different FIB.

Network device 10 also includes forwarding units 20 and a switch fabric (not illustrated in FIG. 3) that together provide a data plane for forwarding network traffic. Forwarding units 20 connect to control unit 12 in this example by communication links 23, which may represent an Ethernet network.

Each of forwarding units 20 may include substantially similar components performing substantially similar functionality, said components and functionality being described hereinafter primarily with respect to forwarding unit 20A illustrated in detail in FIG. 3. Forwarding unit 20A of FIG. 3 may illustrate, in further detail, an example of forwarding unit 20A of FIG. 1. Forwarding unit 20A receives and sends network packets via inbound interfaces 35A-35D (collectively, "inbound interfaces 35") and outbound interfaces 37A-37D (collectively, "outbound interfaces 37"), respectively, of interface cards (IFCs) 22 of forwarding unit 20A. Forwarding unit 20A also includes packet processor 24A, which represents hardware or a combination of hardware and software that provide high-speed forwarding of network traffic. Likewise, forwarding unit 20B includes packet processor 24B, and so on. In some examples, one or more of forwarding units 20 may each include multiple packet processors substantially similar to packet processor 24A.

Each of IFCs 22 may include interfaces for various combinations of layer two (L2) technologies, including Ethernet, Gigabit Ethernet (GigE), and Synchronous Optical Networking (SONET) interfaces. In various aspects, each of forwarding units 20 may include more or fewer IFCs. In some examples, each of packet processors 24 is associated with different IFCs of the forwarding unit on which the packet processor is located. The switch fabric (again, not shown in FIG. 3) connecting forwarding units 20 provides a high-speed interconnect for forwarding incoming transit network packets to the selected one of forwarding units 20 for output over one of IFCs 22.

Network device 10 may in some instances represent a multi-chassis router, and the switch fabric may include a multi-stage switch fabric, such as a 3-stage Clos switch fabric, that relays packet-switched communications and circuit-switched communications between the routing nodes of the multi-chassis router via optical interconnects using multiplexed communications.

Forwarding units 20 of network device 10 demarcate a control plane and a data plane of network device 10. That is, forwarding unit 20A performs both of control plane and data plane functionality. In general, packet processor 24A and IFCs 22 implement a data plane for forwarding unit 20A, while forwarding unit processor 62A executes software including forwarding manager 16A and packet processor driver 60A that implement portions of the network device 10 control plane within forwarding unit 20A. Control unit 12 also implements portions of the control plane of network device 10. Forwarding unit processor 62A of forwarding unit 20A manages packet processor 24A and executes instructions to provide interfaces to control unit 12 and handle host-bound or other local network packets (such as packets that include Options Field values or TTL-expired packets). Forwarding unit processor 62A may execute a microkernel for forwarding unit 20A. The microkernel executed by forwarding unit processor 62A may provide a multi-threaded execution environment for executing modules of forwarding manager 16A and packet processor driver 60.

Packet processor 24A may include programmable ASIC-based, FPGA-based, or other types of packet processors that process network packets by performing a series of operations on each packet over respective internal packet forwarding paths as the packets traverse the internal architecture of network device 10. Packet processor 24A includes forwarding path elements 114 that, in general, when executed, examine the contents of each packet (or another packet property, e.g., incoming interface) and on that basis make forwarding decisions, apply filters, and/or perform accounting, management, traffic analysis, and load balancing, for example. In one example, packet processor 24A arranges forwarding path elements as next hop data that can be chained together as a series of "next hops" along an internal packet forwarding path 66A ("forwarding path 66A") for the packet processor 24A. The result of packet processing determines the manner in which a packet is forwarded or otherwise processed by packet processors 24 of forwarding units 20 from the packet's input interface on an ingress forwarding unit of forwarding units 20 to its output interface on an egress forwarding unit of forwarding units 20.

Packet processor 24A identifies packet properties and performs actions bound to the properties. One or more key engines 71A of packet processor 24A execute microcode (or "microinstructions") of the forwarding path elements to control and apply fixed hardware components of the forwarding path to process packet "keys." A packet key includes packet fields and other parameters that determine a flow of packet processing for the packet along an internal forwarding path. Internal forwarding path 66A ("forwarding path 66A") may represent a computer-readable storage medium, such as random access memory, and includes forwarding path elements in the form of programmable, executable microcode and fixed hardware components that determine the packet processing actions and other operations performed by packet processor 24A. Forwarding path 66A may include, for example, executable instructions, programmable logic, and application-specific logic that perform lookups, rate limit packet flows (e.g., using policers), and manipulate packet keys, among other functions. Forwarding path elements may include primitives such as lookup tables and lookup trees, along with rate limiters, policers, counters, firewalls, and other elements.

Internal forwarding paths of network device 10 may include combinations of respective forwarding paths 66 of multiple different packet processors 24. In other words, forwarding path 66A of packet processor 24A may include only a part of the overall internal forwarding path of network device 10. Control unit 12 may configure forwarding path 66A of packet processor 24A to identify host-bound network packets and forward such packets toward control unit 12. For example, control unit 12 may program filters that include a network address of a network device 10 and direct packet processor 24A to forward network packets having a destination address that matches the network address toward control unit 12.

In some examples, packet processor 24A binds actions to be performed on packets received by the packet processor 24A to identification of one or more properties of the packets. That is, upon identifying certain packet properties, packet processor 24A performs the action bound to the properties. Packet properties may include packet metadata such as a particular packet's ingress interface or egress interface (as determined by the packet processors 24) as well as information carried by the packet and packet header, such as packet header fields, destination route prefixes, layer four (L4) or Transport Layer protocol destination ports, and the packet payload. Actions bound to packet characteristics may include count, discard, forward to a specified forwarding path element or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

Each of key engines 71A includes one or more key buffers to store packet field data for corresponding packets that the key engine is currently processing. Key buffers may also provide limited writable memory to which elements of the internal forwarding path may write to pass messages accessible by future elements.

Forwarding path elements 114 (also referred to as "primitives") of forwarding path 66A include data structures having entries, or "items," that correspond to packet key values and bind the values to actions to be performed by key engines 71A executing forwarding path 66A. In this respect, at least some of forwarding path elements 114 represent a tightly-coupled combination of executable instructions that correspond to bound actions and of data for possible packet key values. A tree lookup one of forwarding path elements 114 may perform a longest-match prefix lookup in a routing table or search a list of prefixes in a filter program. A table lookup one of forwarding path elements 114 may determine whether another one of forwarding path elements 114 should be performed by key engines 71A. For example, a key engine 71A may perform a table lookup of packet properties to determine that key engines 71A should further perform a tree lookup to identify an outbound interface for the packet. Packet processor 24A may store forwarding path elements 114 in computer-readable storage media, such as SRAM. While illustrated within packet processor 24A, forwarding path elements 114 may be stored in memory external and accessible to packet processor 24A.

In some aspects, actions of forwarding path 66 uses a forwarding path element data structure to initiate processing. At the end of each processing step by one of key engines 71A, such as execution of one of forwarding path elements 114, the result is a forwarding path element that may specify additional processing or the termination of processing, for instance. In addition, forwarding path elements may specify or otherwise represent one or more functions to be executed by key engines 71A. Example forwarding path element functions include policing (i.e., rate limiting), counting, and sampling. Forwarding path elements thus form the primary data structure that can be used to initiate a lookup or another forwarding path element, chain lookups and forwarding path elements together to allow for multiple lookup and other operations to be performed on a single packet and terminate a lookup. Key engines 71 may be associated with respective result (or "lookup") buffers that store results for executing forwarding path elements. For example, a key engine 71 may execute a lookup specified by a forwarding path element and store the result of the lookup to the associated result buffer. The contents of a result buffer may affect the actions of the forwarding path element in the forwarding topology.

Forwarding unit 20A receives inbound network traffic by IFCs 22, and packet processor 24A processes network traffic using internal forwarding path 66A. Packet processor 24A looks up outbound interfaces for and forwards transit network packets that are neither host-bound nor otherwise require a response of logical decision by the control plane as outbound traffic via outbound interfaces 37. Although described primarily with respect to a single packet processor 24A and a single forwarding path 66A, forwarding manager 16A for forwarding unit 20A may configure multiple packet processors 24 each having a separate and/or shared forwarding path 66.

Forwarding unit 20A executes forwarding manager 16A software and presents interfaces to control unit 12 for configuring forwarding path 66A. One or more clients 63A, server module ("server") 65A, platform manager 64A, and driver 60A may represent different processes executed by forwarding unit processor 62A using, e.g., an operating environment provided by a microkernel (not shown). Server 65A may be multi-threaded to concurrently support communication with multiple clients 63A. Each of clients 63A may communicate with one thread of server 65A to facilitate all operations specified to that client 63A/thread are executed in a sequence.

Server 65A presents an application programming interface (API) to enable clients 63A to create forwarding path elements 114 in forwarding path 66A by creating, referencing, and connecting forwarding path elements 114 using forwarding path configuration data 102 which includes nodes 110, tokens 112, reverse token references 116, and forward token references 118. Server 65A translates nodes 110 received from clients 63A into corresponding forwarding path elements 114 supported by packet processor 24A. Each of forwarding path elements 114 has a corresponding one of nodes 110 stored by server 65A and accessible using the server 65A API. Clients 63A use the API for nodes 110 to create sandboxes, program entries into lookup-type forwarding path elements 114 and connect forwarding path elements 114 to program end-to-end forwarding state.

In this way, server 65A implements a stateful translation bridge between clients 63A and the underlying hardware/forwarding path 66A of packet processor 24A. For example, clients 63A send a stream of nodes and entries and server 65A translates the nodes and entries into forwarding path elements 114 for configuring forwarding path.

Compiler 14 may be configured to generate a software image 101 which, when executed by client(s) 63A, causes forwarding manager 16A to generate forwarding path configuration data 102 based on data 27 received by client(s) 63A from applications 15. By generating forwarding path configuration data 102, forwarding manager 16A configures one or more forwarding path elements 114 each corresponding to a respective node of nodes 110. For example, compiler 14 may receive data including syntax 84 (e.g., text in the form of syntax). As used herein, the term "syntax" may refer to a collection of characters, numbers, and symbols which form a logical structure of terms. This logical structure of terms may include, for example, a set of operands and a set of operators. Operands represent objects and operators represent functions which accept one or more operands as inputs. Consequently, syntax 84 may include user instructions to configure one or more forwarding path elements 114 in ways specified by the operators and operands represented in syntax 84.

In some examples, the set of operators represented by syntax 84 may include one or more operands which each correspond to a respective node of a set of nodes (e.g., nodes 110) of the forwarding path configuration data 102. In turn, each node of nodes 110 corresponds to a respective forwarding path element of forwarding path elements 114. One or more operators of the set of operators represented by syntax 84 may define one or more relationships between the operands which correspond to nodes 110. For example, the one or more operators may indicate that the operand corresponding to node 110B follows the operator corresponding to node 110A, meaning that forwarding path element 114B follows forwarding path element 114A in the forwarding path 66A. Compiler 14 may generate code based on syntax 84 received by compiler 14. In turn, compiler 14 may compile the code in order to generate software image 101 which causes forwarding path configuration data 102 to include a reverse token reference 116 which connects node 110B to token 112A and a forward token reference 118 which connects node 110A to token 112B. In turn, forwarding manager 16A may configure forwarding path element 114B to follow forwarding path element 114A in forwarding path 66A.

Compiler 14 may use parsing unit 82 to determine one or more relationships between operands represented in syntax 84. For example, the set of operands may define a hierarchy which includes one or more "paths." Each path of the one or more paths in the hierarchy may represent a chain of operands extending from a first operand to a last operand. The one or more relationships, which are indicated by operators in syntax 84, may define an order of a set of operators which form a respective path of the one or more paths. For example, a first operand may precede a second operand in a path, and a third operand may follow the second operand in the path. One or more operators may indicate that the order of the path includes the first operand, followed by the second operand, followed by the third operand. To determine the hierarchy of the one or more operands, parsing unit 82 may parse syntax 84 to determine the one or more paths of the hierarchy.

Parsing unit 82 may employ linguistic parsing techniques. In other words, parsing unit 82 may take syntax 84 including the set of operands and the set of operators and determine a hierarchy of operands which corresponds to a node topology for configuring one or more forwarding path elements. The data structure may include at least one of a parse tree, an abstract syntax tree, a flowchart, or another visual representation. As such, parsing unit 82 is configured to identify a representation of the hierarchy of operands in syntax 84.

Compiler 14 is configured to generate software image 101 by compiling code generated by compiler 14 based on the hierarchy of operands identified by parsing unit 82. In some examples, software image 101 may execute on client(s) 63A. Additionally, or alternatively, the software image may execute in user space 41. When executed (e.g., by forwarding manager 16A and/or control unit 12), The software image 101 generated by compiler 14 may cause forwarding manager 16A to generate or modify forwarding path configuration data 102 in client(s) 63A. for example, the hierarchy of operands may correspond to a node topology of the forwarding path configuration data 102 since one or more operands of syntax 84 may each correspond to a respective node of nodes 110. As such, when forwarding manager 16A executes the software image 101, forwarding manager 16A generates forwarding path configuration data 102 to include reverse token references 116 and forward token references 118 such that the node topology of forwarding path configuration data 102 reflects the operand hierarchy indicated by syntax 84. By generating forwarding path configuration data 102, forwarding manager 16A configures forwarding path elements 114 based on the node topology indicated by the software image 101. This means that the hierarchy of operands represented in syntax 84 causes the configuration of the forwarding path elements 114 in the forwarding path 66A.

Packet processor driver 60A (hereinafter, "driver 60A"), configured for execution by forwarding unit processor 62A, configures forwarding path 66A with forwarding path elements 114 for execution by packet processor 24A. Packet processor driver 60A receives forwarding path elements 114 from server 65A and platform manager 64A. Forwarding path elements 114 may include instructions executable by packet processor 24A. For example, client(s) 63A, platform manager 64A and driver 60A receive data 27 from applications 15. Client(s) 63A may execute the software image 101 generated by compiler 14 in order to configure forwarding path elements 114 using at least some of the data 27 received from applications 15.

At least a portion of software image 101 includes data for configuring forwarding path elements 114. Client(s) 63A translate the software image 101 to nodes 110 which platform manager 64A and server 65A push to driver 60A in order to configure forwarding path 66A. Client(s) 63A may represent an interface adapter, e.g., a P4, OpenFlow, Switch Abstraction Interface (SAI), or other software-defined networking (SDN) protocol interface adapter that translates the operations to nodes 110. Client(s) 63A push nodes 110 of forwarding element configuration data 102 to server 65A, which configures the corresponding forwarding path elements 114 in forwarding path 66A using driver 60A.

In some cases, client(s) 63A may adjust a parameter (e.g., a policer parameter changed in the configuration) or change a dependency (e.g., point a route prefix to a different next hop) for a node. Server 65A may consider nodes and entries immutable (i.e., unchangeable) once configured in the forwarding path 66A. Accordingly, to change the node, client(s) 63A insert a new node with the same token value as the node being "modified." Server 65A receives the new node, deletes the forwarding path element corresponding to the old node from forwarding path 66A, inserts a new forwarding path element corresponding to the new node in forwarding path 66A, regenerates any underlying hardware state, and updates any among forwarding path elements 114. As a result of the server 65A providing this service, the client(s) 63A need only insert the new, updated node.

In one example, syntax 84 includes the following first example syntax:

```
interface [...attributes...] => {
    vlan-table[...attributes...] => {
        +vlan-table-entry[...attributes...] => {
            iflist[...attribute...] => {
                filter[...attribute...] => { }
                & classifier[...attribute...] =>{ }
                & route-table[...attribute...] =>{ }
            }
        }
    }
}
```

As seen above, the first example syntax includes a set of operands (e.g., "interface," "vlan-table," "+vlan-table-entry," "iflist," "filter," "classifier," and "route-table." In some examples, each of these operands corresponds to a respective forwarding path element of forwarding path elements 114. Additionally, the first example syntax includes a set of operators (e.g., dependency operators (=>) and ampersand operators (&)). The set of operators define relationships between the set of operands. The first example syntax, in some cases, defines one or more paths in which the vlan-table operand follows the interface operand, the vlan-table-entry operand follows the vlan-table operand, and the iflist operand follows the vlan-table-entry operand. Additionally, all three of the filter operand, the classifier operand, and the route-table operand follow the iflist operand. In other words, the iflist operand is followed by a branch, where the branch includes a first path which leads to the filter operand, a second path which leads to the classifier operand, and a third path which leads to the route-table operand, as indicated by the & operator preceding the classifier operand and the & operator preceding the route-table operator. In other words, the syntax causes, in response to the iflist node being instantiated, the network device 10 to instantiate the filter node, the classifier node, and the route-table node. A dependency operator (=>) indicates that one operator is followed by another operator. As such, the portion of the first example syntax including "interface [ . . . attributes . . . ]=>{vlan-table[ . . . attributes . . . ]}" indicates that the vlan-table operator follows the interface operator in the hierarchy of operators in the first example syntax.

Parsing unit 82 of compiler 14 is configured to parse syntax 84 received by compiler 14. For example, parsing unit 82 may be configured to identify the one or more paths of operands indicated in syntax 84 and generate code which includes information indicative of the one or more identified paths. In some examples, the code includes text of the C++ programming language, but this is not required. The code may include text of any programming language. Subsequently, compiler 14 may compile the code in order to generate software image 101, which is executable by network device 10 (e.g., executable by forwarding manager 16A and/or control unit 12). Client(s) 63 may execute software image 101 generated by compiler 14 in order to configure forwarding path elements 114. In some examples, when client(s) 63 execute software image 101, client(s) 63 look up one or more attributes corresponding to each operand of the set of operands in syntax 84 received by compiler 14. For example, the syntax element "[ . . . attributes . . . ]" in the text "interface [ . . . attributes . . . ]" represents a request to look up one or more attributes corresponding to an interface forwarding path elements. In turn, compiler 14 may generate the code in order to include information indicative of an instruction to look up the one or more attributes corresponding to the interface forwarding path element. As such, when the compiler 14 compiles the code and generates the software image 101, the software image 101 reflects the information indicative of the instruction to look up the one or more attributes corresponding to the interface forwarding path element. When client(s) 63 execute software image 101, client(s) 63 look up the attributes in data 27 received from applications 15. As such, client(s) 63 may execute software image 101 in order to configure forwarding path elements 114 based on forwarding path element attributes included in data 27.

In some examples, software image 101 calls an application API to create forwarding elements 114, forwarding path configuration data 102, support a query for the token of a forwarding path element, install or uninstall any of forwarding path elements 114, or any combination thereof. Compiler 14 may determine a way in which the topology is arranged by parsing syntax 84, and compiler 14 may generate code and compile the code to generate software image 101 so that forwarding path elements 114 reflect the topology indicated by syntax 84 received by compiler 14.

In some examples, compiler 14 may receive one or more edits to the first example syntax and update the software image 101 based on the one or more edits. The following second example syntax represents an edited version of the first example syntax.

```
interface [...attributes...] => {
    vlan-table[...attributes...] => {
        +vlan-table-entry[...attributes...] => {
            if-list => {
                (
                    filter[...attribute...] => { }
                    | classifier[...attribute...] =>{ }
                )
                & route-table[...attribute...] =>{ }
            }
        }
    }
}
```

The second example syntax includes the "filter[ . . . attribute . . . ]=>{ }| classifier[ . . . attribute . . . ]=>{ }" segment of text. The inclusive OR (p) operator means that if a first forwarding path element is instantiated, a second forwarding path element is not instantiated and if the first forwarding path element is not instantiated, a second forwarding path elements is instantiated. In the case of the second sample syntax, when the filter forwarding path element is instantiated, the classifier forwarding path element is not instantiated and when the forwarding path element is not instantiated, the classifier forwarding path element is instantiated.

In some examples, classifier 14 may receive the second example syntax which represents an update to the first example syntax without making any change to application code executing on compiler 14 and/or network device 10. The high-level language of syntax 84 received by compiler 14 may be beneficial with respect to debugging syntax 84. For example, compiler 14 may identify one or more loops in syntax 84 (e.g., a first operand pointing to a second operand which in-turn points to the first operand) and output an error message in response to detecting the loop. Additionally, or alternatively, compiler 14 may apply one or more token reuse policies.

In some examples, syntax 84 may include the following third example syntax:

```
Interface[IfPtr:] => {
    SetIIF[ IfInfo : IfInfofromIfPtr ] => {
        Counter[IFType : IfTypeFromIfInfo] => { }
        & (
            MarkDown[ IfState : IfStateFromIfPtr ]
            | (
                Classifier[ClassifierData : ClassifierDataFromIfPtr] =>
                { }
                & Filter[FilterData : ] => { }
            )
        )
    }
}
```

The third example syntax includes the operands "SetIIF," "Counter," "MarkDn," "Classifier," and "Filter." Additionally, the third example syntax includes the operators "=>," "&," and "|." Compiler 14 may generate code and compile the code to generate software image 101 which, when executed by forwarding manager 16A, causes forwarding manager 16A to generate a node topology based on the hierarchy of operands defined by operators of the third example syntax and causes forwarding manager 16A to configure forwarding path elements 144 to reflect the hierarchy of operands. The third example syntax is easily modifiable in order to modify a configuration of the forwarding path 66A.

As seen in the third example of syntax received by compiler 14, each of the "SetiIF," "Counter," "MarkDn," "Classifier," and "Filter" operands are associated with requests for one or more forwarding path element attributes. For example, the text "Interface[IfPtr:]" represents a request for "IfPtr:" attributes associated with the "Interface" forwarding path element. The "IfPtr:" may be included in the data 27 received from applications 15.

Text (e.g., syntax 84) received by compiler 14 for the purpose of configuring forwarding path elements 114 may be in the form of a high-level programming language which is easily re-configurable by a user. For example, the below text represents a first version of a hierarchy of operands:

```
(
    MarkDown[ ... ] => { }
    | (
        Classifier[...] => { }
        & Filter[...] => { }
    )
)
```

The above text includes the inclusive OR operator (1), indicating that if the MarkDown node is instantiated, the Classifier node is not instantiated. A user may re-configure the text as follows:
& MarkDown[ . . . ]=>{ }
& Classifier[ . . . ]=>{ }
& Filter[ . . . ]=>{
This text indicates that the MarkDown node, the Classifier node, and the Filter node are all arranged in one level of the node topology. In any case, the text may be re-arranged according to the high-level language.

Figure 4:
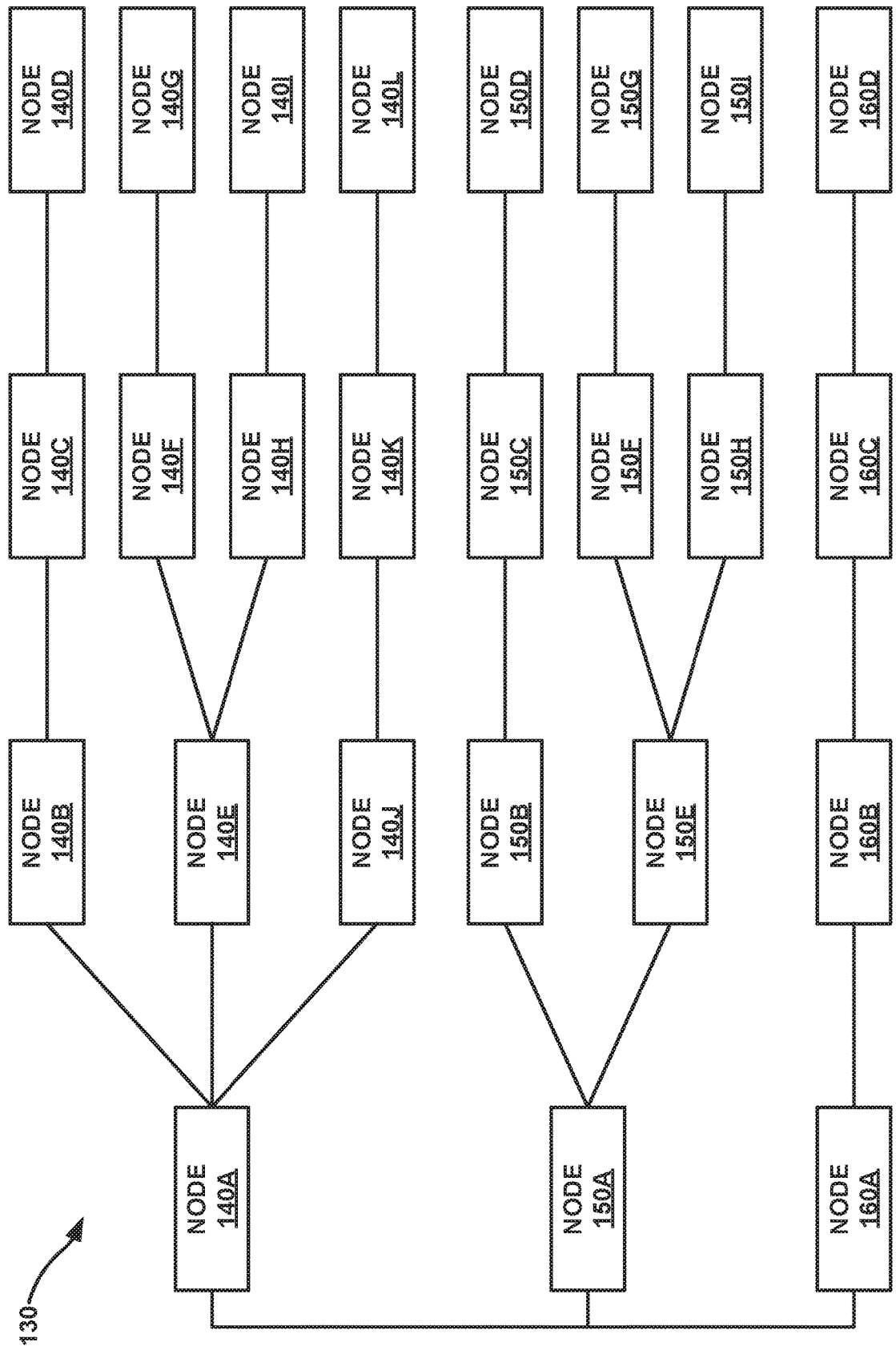
FIG. 4 is a block diagram illustrating a node topology of a plurality of nodes, in accordance with one or more techniques of this disclosure.

FIG. 4 is a block diagram illustrating a node topology of a plurality of nodes 130, in accordance with one or more techniques of this disclosure. The plurality of nodes 130 include a first set of nodes 140A-140L (collectively, "nodes 140"), a second set of nodes 150A-150I (collectively, "nodes 150"), and a third set of nodes 160A-160D (collectively, "nodes 160"). The plurality of nodes 130 may be example instances of nodes 110 of FIGS. 2-3.

As seen in FIG. 4, the plurality of nodes 130 form a topology which includes a set of paths through the plurality of nodes 130. For example, one path starts with node 140A, proceeds to node 140B, proceeds to node 140C, and ends at node 140D. Another path starts with node 150A, proceeds to node 150E, proceeds to node 150H, and ends at node 150I. A "path" may refer to any sequence of nodes which includes a first node, a last node, and all other nodes which connect the first node and the last node. Although tokens are not illustrated in FIG. 4, each node of the plurality of nodes 130 may include a token which other nodes may refer to in order to establish the topology of the plurality of nodes 130. For example, node 140H may refer to a token of node 140E and refer to a token of node 140A in order to indicate that node 140H follows node 140E in a path and precedes node 140I in the path.

In some examples, forwarding manager 16A may instantiate the topology of the plurality of nodes 130 as a part of forwarding path configuration data 102, thus configuring forwarding path elements 144 according to the topology of nodes 130. This may cause forwarding manager 16A to configure forwarding path elements 114 to include a forwarding path element corresponding to each node of the plurality of nodes 130. Forwarding manager 16A may configure forwarding path elements 144 such that a forwarding path exists in packet processor 24A corresponding to each path of the set of paths indicated by the topology of the plurality of nodes 130. That is, forwarding path elements 114 form a first forwarding path corresponding to the path which includes node 140A, node 140B, node 140C, and node 140D, forwarding path elements 114 form a second forwarding path corresponding to the path which includes node 140A, node 140E, node 140F, and node 140G, and so on.

In some examples, forwarding manager 16A may generate forwarding path configuration data 102 to include nodes 130 in the node topology illustrated in FIG. 4 responsive to executing software image 101. In some examples, compiler 14 generates the software image 101 responsive to receiving one or more instructions in the form of syntax (e.g., syntax 84 of FIG. 3). Syntax 84 may include an operand corresponding to each node of nodes 130 and a set of operators which indicate relationships between the operands. That is, syntax 84 includes a hierarchy of operands defined by one or more operators. In executing software image 101, forwarding manager 16A may map the hierarchy of operands to the plurality of nodes 130 in the forwarding path configuration data 102 such that the topology reflects the hierarchy of operands. By mapping the hierarchy of operands to the node topology, forwarding manager 16A may configure the forwarding path elements 114 to reflect the node topology of nodes 130.

Figure 5:
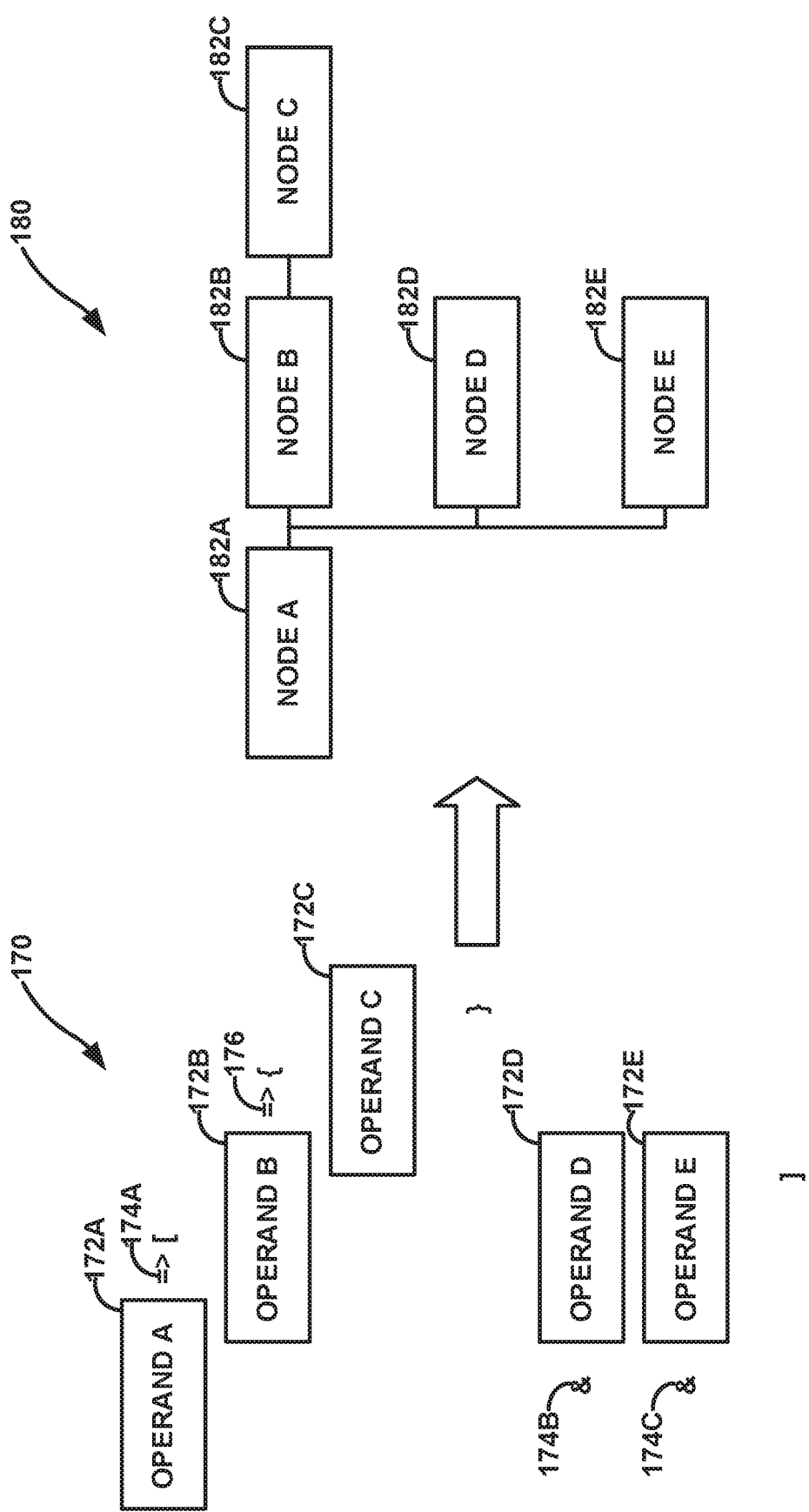
FIG. 5 is a conceptual diagram illustrating a relationship between syntax and a node topology which is generated based on the syntax, in accordance with one or more techniques of this disclosure.

FIG. 5 is a conceptual diagram illustrating a relationship between syntax 170 and a node topology 180 which is generated based on the syntax 170, in accordance with one or more techniques of this disclosure. In some examples, syntax 170 may be an example of syntax 84 received by compiler 14 of FIG. 1. In some examples, node topology 180 may represent a node topology which forwarding manager 16A generates in forwarding path configuration data 102 and configures in forwarding path 66A based on receiving code generated by compiler 14 based on syntax 170.

As seen in FIG. 5, syntax 170 includes operands 172A-172E (collectively, "operands 172"), a set of first operators 174A-174C (collectively, "operators 174"), and a second operator 176. Node topology 180 may include nodes 182A-182E (collectively, "nodes 182"). Nodes 182 may be example instances of nodes 30A of FIG. 1. A placement of operands 172, the set of first operators 174, and the second operator 176 within syntax 170 determine the arrangement of nodes 182 within the node topology 180. For example, in syntax 170, operand 172A is followed by operator 174A of the set of first operators 174. Operator 174A is a dependency operator "=>" which indicates that any operands that follow operator 174A within the brackets "[ ]" depend from operand 172A. As such, operand 172B, operand 172D, and operand 172E all depend from operand 172A. Operators 174B and 174C are "and" operators "&" which indicate that operand 172B and operand 172D and operand 172E follow operand 172A in the hierarchy of operands indicated by syntax 170. Second operator 176 is also a dependency operator "=>." Second operator 176 indicates that any operands that follow operator 174B within the brackets "{ }" depend from operand 172B. As such, operand 172C depends from operand 172B within the hierarchy of operands indicated by syntax 170.

Node topology 180 reflects the hierarchy of operands indicated by syntax 170. Node 182A corresponds to operand 172A, node 182B corresponds to operand 172B, and so on. For example, node topology 180 shows that node 182A, node 182D, and node 182E all follow node 182A within node topology 180. Additionally, node 182C follows node 182B within node topology 180. As such, a layout of node topology 180 is readily visible in syntax 170. In this way, it may be easier to modify node topology 180, and thus modify the forwarding path elements 114 of forwarding path 66A by modifying syntax 170 as compared with systems which do not generate forwarding path element configuration data based on syntax which reflects the layout of the node topology.

Figure 6:
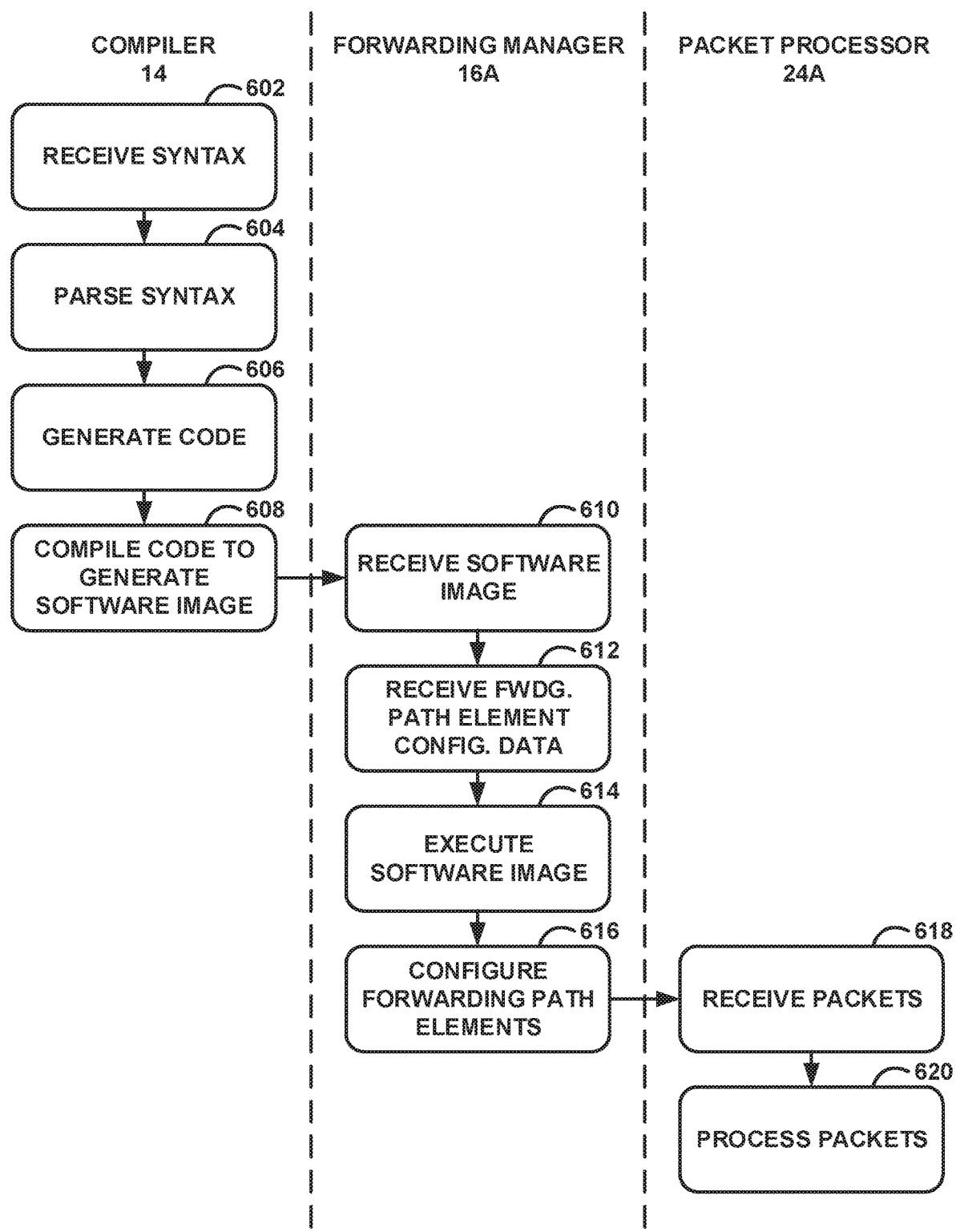
FIG. 6 is a flow diagram illustrating an example operation for configuring a forwarding path of a network device based on syntax received by a compiler of the network device, in accordance with one or more techniques of this disclosure.

FIG. 6 is a flow diagram illustrating an example operation for configuring a forwarding path of a network device based on syntax received by a compiler of the network device, in accordance with one or more techniques of this disclosure. For convenience, FIG. 6 is described with respect to network device 10 and compiler 14 of FIG. 1 and FIG. 3. However, the techniques of FIG. 6 may be performed by different components of network device 10 and compiler 14 or by additional or alternative devices.

Network device 10 may include, for example, a control unit 12 and one or more forwarding units 20. The control unit 12 may include a compiler 14 which is configured to receive and process syntax. The syntax may represent user input indicative of instructions to configure a forwarding path executing on one or more of forwarding units 20. The instructions included by the syntax may include, for example, an order of forwarding path elements to be configured in the forwarding path. The syntax may display a relationship between one or more forwarding path elements such that a user may be able to view the order of one or more forwarding path elements to be configured in the forwarding path.

Compiler 14 may be configured to receive syntax 84 (602). Parsing unit 82 of compiler 14 may parse syntax 84 (604) received by compiler 14. In some examples, syntax 84 includes a set of operands and a set of operators. The set of operands may include one or more operands which each correspond to a forwarding path element of one or more forwarding path elements. The set of operators may define one or more relationships between operands of the set of operands. For example, the set of operands and the set of operators may indicate that a first operand is followed by a second operand and the second operand is followed by a third operand. In this case, network device 10 may configure a first forwarding path element corresponding to the first operand followed by a second forwarding path element corresponding to the second operand followed by a third forwarding path element corresponding to the third operand based on forwarding path configuration data 102.

Compiler 14 may generate code (606) responsive to parsing syntax 84 received by compiler 14. In some examples, the code may represent text of the C++ programming language. The programming language of the code may be different than a programming language of syntax 84 received by compiler 14 which compiler 14 uses to generate software image 101. Compiler 14 compiles the code in order to generate software image 101 for output (608) to forwarding manager 16A. In some examples, software image 101 is executable by network device 10 while the code generated by compiler 14 responsive to parsing syntax 84 is not executable by network device 10.

Forwarding manager 16A receives software image 101 (610). Additionally, forwarding manager 16A receives forwarding path element configuration data 27 from applications 15 (612). Client(s) 63A may execute the software image 101 (614) in order to configure forwarding path elements 114 (616) based on relationships between the operands as indicated by the operators of syntax 84 received by compiler 14 and based on the forwarding path element configuration data 27. Subsequently, packet processor 24A may receive packets (618) and process the packets (620) using the one or more forwarding path elements configured by forwarding manager 16A based on the forwarding path configuration data 102.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Additionally, or alternatively, if implemented in software or firmware, the techniques may be realized at least in part by a computer-readable data storage medium including instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as RAM, read-only memory (ROM), non-volatile random access memory (NVRAM), EEPROM, Flash memory, magnetic or optical data storage media, and the like. In some examples, an article of manufacture may include one or more computer-readable storage media.

In some examples, the computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network device system comprising:
   a compiler which is configured to:
      receive text comprising syntax elements, wherein each node of a plurality of nodes corresponds to a forwarding path element of a plurality of forwarding path elements, wherein the text indicates one or more connections between respective nodes of the plurality of nodes to indicate a topology for the plurality of nodes in the text;
      generate, based on the text, code for instantiating the plurality of nodes in the indicated topology for the plurality of nodes; and
      compile the code to generate a software image for a network device; and
   the network device comprising:
      a forwarding manager configured to execute the software image to configure a forwarding path to include the corresponding forwarding path element for each of the plurality of nodes; and
      at least one packet processor operably coupled to a memory, wherein the at least one packet processor is configured to process packets received by the network device by executing the forwarding path elements.

2. The network device system of claim 1, wherein the topology for the plurality of nodes is visible in the text.

3. The network device system of claim 1, wherein the text comprises:
   a set of operands, wherein each operand of the set of operands represents one or more nodes of the plurality of nodes; and
   a set of operators, wherein each operator of the set of operators defines a relationship between a first one or more operands of the set of operands and a second one or more operands of the set of operands.

4. The network device system of claim 3, wherein the set of operators includes one or more ampersand (&) operators, wherein each & operator of the one or more & operators represents an instruction to, when a first one or more operands is present, instantiate a second one or more operands.

5. The network device system of claim 3, wherein the set of operators includes one or more OR (|) operators, wherein each | operator of the set of | operators represents an instruction to:
   when a first one or more operands is not present, instantiate a second one or more operands; and
   when the first one or more operands is present, refrain from instantiating the second one or more operands.

6. The network device system of claim 3, wherein the set of operators defines a hierarchy of the set of operands, wherein the hierarchy comprises a set of levels, wherein the hierarchy of the set of operands corresponds to the topology for the plurality of nodes, and wherein the set of operators comprises:
   a first subset of operators, wherein each operator of the first subset of operators defines a relationship between an operand of the set of operands which is located in a level of the set of operands and one or more other operands of the set of operands which are located in another level of the set of levels which is adjacent to the level of the set of levels; and
   a second subset of operators, wherein each operator of the second subset of operators defines a relationship between two or more operands of the set of operands which are located in a same level of the set of levels.

7. The network device system of claim 1, wherein to execute the software image in order to configure the forwarding path, the forwarding manager is configured to configure the forwarding path in order to reflect the topology for the plurality of nodes indicated by the text.

8. The network device system of claim 1, wherein the generated code is in a C++ programming language representation, and wherein the software image represents computer code executable by the forwarding manager.

9. The network device system of claim 1, wherein the text represents a first text, wherein the syntax elements are first syntax elements, wherein the topology is a first topology, wherein the plurality of nodes is a first plurality of nodes, wherein the plurality of forwarding path elements is a first plurality of forwarding path elements, wherein the code is first code, wherein the software image is a first software image, and wherein the compiler is further configured to:
receive second text comprising second syntax elements in an arrangement that indicates a second topology for a second plurality of nodes, wherein each node of the second plurality of nodes corresponds to a forwarding path element of a second plurality of forwarding path elements;
generate, based on the second text, second code for instantiating the second plurality of nodes in the indicated second topology for the second plurality of nodes; and
compile the second code to generate a second software image for the network device,
wherein the forwarding manager is further configured to execute the second software image to configure the forwarding path to include the corresponding forwarding path element for each of the second plurality of nodes.

10. The network device system of claim 1, wherein to configure the forwarding path, the forwarding manager is configured to:
execute the generated code to instantiate the plurality of nodes each comprising a unique token, wherein a first node of the plurality of nodes includes a token reference set to a value for the token of a second node of the plurality of nodes; and
configure, based on the plurality of nodes, the forwarding path to include the respective forwarding path element corresponding to each node of the plurality of nodes.

11. The network device system of claim 10, wherein configuring the forwarding path to include respective forwarding path elements for the nodes comprises:
based at least on the token reference of the first node, set a next hop of a first forwarding path element corresponding to the first node to a second forwarding path element corresponding the second node.

12. The network device system of claim 1, wherein each of the forwarding path elements comprises one of a lookup tree, a lookup table, a rate limiter, a policer, and a counter.

13. The network device system of claim 1, wherein the first node represents a lookup-type forwarding path element and comprises an entry having a key for matching a lookup item and a node token that includes the token reference set to the value for the token of the second node of the nodes, wherein the node token identifies the second node as a node to execute on a successful match of the key to the lookup item.

14. A method comprising:
receiving, by a compiler, text comprising syntax elements, wherein each node of a plurality of nodes corresponds to a forwarding path element of a plurality of forwarding path elements, wherein the text indicates one or more connections between respective nodes of the plurality of nodes to indicate a topology for the plurality of nodes in the text;
generating, by the compiler based on the text, code for instantiating the plurality of nodes in the indicated topology for the plurality of nodes;
compiling, by the compiler, the code to generate a software image for a network device;
executing, by a forwarding manager of the network device, the software image to configure a forwarding path to include the corresponding forwarding path element for each of the plurality of nodes; and
processing, by at least one packet processor operably coupled to a memory, packets received by the network device by executing the forwarding path elements.

15. The method of claim 14, wherein the topology for the plurality of nodes is visible in the text.

16. The method of claim 14, wherein the text comprises:
a set of operands, wherein each operand of the set of operands represents one or more nodes of the plurality of nodes; and
a set of operators, wherein each operator of the set of operators defines a relationship between a first one or more operands of the set of operands and a second one or more operands of the set of operands.

17. The method of claim 16, wherein the set of operators includes one or more ampersand (&) operators, wherein each & operator of the one or more & operators represents an instruction to, when a first one or more operands is present, instantiate a second one or more operands.

18. The method of claim 16, wherein the set of operators includes one or more OR (|) operators, wherein each | operator of the set of | operators represents an instruction to:
when a first one or more operands is not present, instantiate a second one or more operands; and
when the first one or more operands is present, refrain from instantiating the second one or more operands.

19. The method of claim 16, wherein the set of operators defines a hierarchy of the set of operands, wherein the hierarchy comprises a set of levels, wherein the hierarchy of the set of operands corresponds to the topology for the plurality of nodes, and wherein the set of operators comprises:
a first subset of operators, wherein each operator of the first subset of operators defines a relationship between an operand of the set of operands which is located in a level of the set of operands and one or more other operands of the set of operands which are located in another level of the set of levels which is adjacent to the level of the set of levels; and
a second subset of operators, wherein each operator of the second subset of operators defines a relationship between two or more operands of the set of operands which are located in a same level of the set of levels.

20. A non-transitory computer-readable medium comprising instructions for causing one or more programmable processors and at least one packet processor of a forwarding unit of a network device to:
receive, by a compiler, text comprising syntax elements, wherein each node of a plurality of nodes corresponds to a forwarding path element of a plurality of forwarding path elements, wherein the text indicates one or more connections between respective nodes of the plurality of nodes to indicate a topology for the plurality of nodes in the text;
generate, by the compiler based on the text, code for instantiating the plurality of nodes in the indicated topology for the plurality of nodes;
compile, by the compiler, the code to generate a software image for a network device;
execute, by a network device, the software image to configure a forwarding path to include the corresponding forwarding path element for each of the plurality of nodes; and
process, by the at least one packet processor operably, packets received by the network device by executing the forwarding path elements.

21. A network device system comprising:
a compiler which is configured to:

receive text comprising syntax elements in an arrangement that indicates a topology for a plurality of nodes, wherein each node of the plurality of nodes corresponds to a forwarding path element of a plurality of forwarding path elements, and wherein the text comprises:
- a set of operands, wherein each operand of the set of operands represents one or more nodes of the plurality of nodes; and
- a set of operators, wherein each operator of the set of operators defines a relationship between a first one or more operands of the set of operands and a second one or more operands of the set of operands;

generate, based on the text, code for instantiating the plurality of nodes in the indicated topology for the plurality of nodes; and compile the code to generate a software image for a network device; and the network device comprising:
- a forwarding manager configured to execute the software image to configure a forwarding path to include the corresponding forwarding path element for each of the plurality of nodes; and
- at least one packet processor operably coupled to a memory, wherein the at least one packet processor is configured to process packets received by the network device by executing the forwarding path elements.

22. The network device system of claim 21, wherein the set of operators includes one or more ampersand (&) operators, wherein each & operator of the one or more & operators represents an instruction to, when a first one or more operands is present, instantiate a second one or more operands.

23. The network device system of claim 21, wherein the set of operators includes one or more OR (|) operators, wherein each | operator of the set of | operators represents an instruction to:
- when a first one or more operands is not present, instantiate a second one or more operands; and
- when the first one or more operands is present, refrain from instantiating the second one or more operands.

24. The network device system of claim 21, wherein the set of operators defines a hierarchy of the set of operands, wherein the hierarchy comprises a set of levels, wherein the hierarchy of the set of operands corresponds to the topology for the plurality of nodes, and wherein the set of operators comprises:
- a first subset of operators, wherein each operator of the first subset of operators defines a relationship between an operand of the set of operands which is located in a level of the set of operands and one or more other operands of the set of operands which are located in another level of the set of levels which is adjacent to the level of the set of levels; and
- a second subset of operators, wherein each operator of the second subset of operators defines a relationship between two or more operands of the set of operands which are located in a same level of the set of levels.

25. A method comprising:

receiving, by a compiler, text comprising syntax elements in an arrangement that indicates a topology for a plurality of nodes, wherein each node of the plurality of nodes corresponds to a forwarding path element of a plurality of forwarding path elements, and wherein the text comprises:
- a set of operands, wherein each operand of the set of operands represents one or more nodes of the plurality of nodes; and
- a set of operators, wherein each operator of the set of operators defines a relationship between a first one or more operands of the set of operands and a second one or more operands of the set of operands;

generating, by the compiler based on the text, code for instantiating the plurality of nodes in the indicated topology for the plurality of nodes;

compiling, by the compiler, the code to generate a software image for a network device;

executing, by a forwarding manager of the network device, the software image to configure a forwarding path to include the corresponding forwarding path element for each of the plurality of nodes; and processing, by at least one packet processor operably coupled to a memory, packets received by the network device by executing the forwarding path elements.

26. The method of claim 25, wherein the set of operators includes one or more ampersand (&) operators, wherein each & operator of the one or more & operators represents an instruction to, when a first one or more operands is present, instantiate a second one or more operands.

27. The method of claim 25, wherein the set of operators includes one or more OR (|) operators, wherein each | operator of the set of | operators represents an instruction to:
- when a first one or more operands is not present, instantiate a second one or more operands; and
- when the first one or more operands is present, refrain from instantiating the second one or more operands.

28. The method of claim 25, wherein the set of operators defines a hierarchy of the set of operands, wherein the hierarchy comprises a set of levels, wherein the hierarchy of the set of operands corresponds to the topology for the plurality of nodes, and wherein the set of operators comprises:
- a first subset of operators, wherein each operator of the first subset of operators defines a relationship between an operand of the set of operands which is located in a level of the set of operands and one or more other operands of the set of operands which are located in another level of the set of levels which is adjacent to the level of the set of levels; and
- a second subset of operators, wherein each operator of the second subset of operators defines a relationship between two or more operands of the set of operands which are located in a same level of the set of levels.

* * * * *